(12) United States Patent
White et al.

(10) Patent No.: US 11,772,572 B2
(45) Date of Patent: *Oct. 3, 2023

(54) SPEAKER SYSTEMS FOR OFF-ROAD VEHICLES, ATVS, UTVS, WATERCRAFT, AND MOTORCYCLES

(71) Applicant: Wet Sounds, Inc., Houston, TX (US)

(72) Inventors: Timothy J. White, Round Rock, TX (US); Brett A. Triola, Houston, TX (US)

(73) Assignee: Wet Sounds, Inc., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/691,938

(22) Filed: Nov. 22, 2019

(65) Prior Publication Data

US 2020/0086804 A1 Mar. 19, 2020

Related U.S. Application Data

(63) Continuation of application No. 15/283,724, filed on Oct. 3, 2016, now Pat. No. 10,486,613, which is a
(Continued)

(51) Int. Cl.
*H04R 1/02* (2006.01)
*B60R 11/02* (2006.01)
(Continued)

(52) U.S. Cl.
CPC .......... *B60R 11/0217* (2013.01); *H04R 1/026* (2013.01); *H04R 1/403* (2013.01);
(Continued)

(58) Field of Classification Search
CPC . H04R 1/00; H04R 1/02; H04R 1/026; H04R 1/028; H04R 2201/02;
(Continued)

(56) References Cited

U.S. PATENT DOCUMENTS 1,697,803 A  1/1929 Roscoe
3,927,402 A * 12/1975 Thompson .............. A63J 17/00
                                                340/815.45
(Continued)

OTHER PUBLICATIONS

"Jeep Wrangler YJ TJ JK Kicker System KS525 Custom Quad (4) 5 1/4" Speakers Power Sports UTV Pod," downloaded from www.hifisoundconnection.com on Feb. 11, 2013, 1 page.
(Continued)

*Primary Examiner* — Thang V Tran
(74) *Attorney, Agent, or Firm* — Egan, Enders & Huston LLP.

(57) ABSTRACT

Speaker systems are provided, particularly for mounting in off-road vehicles, ATVs, UTVs, watercraft and motorcycles. The speaker systems may include a linear array of speakers and a housing encasing a backside thereof. In some cases, the speaker systems include a pipe-mounting clamp coupled to the housing for mounting the speaker system to a surface. In addition or alternatively, the speaker systems may include mounting brackets arranged along opposing lateral sides of the housing for mounting the speaker system to a surface. In any case, the speaker systems may include a power cord extending from one of the opposing lateral sides of the housing in some embodiments.

18 Claims, 3 Drawing Sheets

Related U.S. Application Data continuation of application No. 14/180,879, filed on Feb. 14, 2014, now Pat. No. 9,469,254, and a continuation-in-part of application No. 29/445,656, filed on Feb. 14, 2013, now Pat. No. Des. 756,964, which is a continuation-in-part of application No. 29/445,659, filed on Feb. 14, 2013, now Pat. No. Des. 757,687, and a continuation-in-part of application No. 29/445,640, filed on Feb. 14, 2013, now Pat. No. Des. 756,962, and a continuation-in-part of application No. 29/445,652, filed on Feb. 14, 2013, now Pat. No. Des. 756,963, and a continuation-in-part of application No. 29/445,639, filed on Feb. 14, 2013, now Pat. No. Des. 756,961, and a continuation-in-part of application No. 29/445,651, filed on Feb. 14, 2013, now Pat. No. Des. 757,686.

(60) Provisional application No. 61/764,637, filed on Feb. 14, 2013.

(51) Int. Cl.
| | |
|---|---|
| *H04R 1/40* | (2006.01) |
| *F21Y 113/13* | (2016.01) |
| *F21S 10/02* | (2006.01) |
| *F21W 121/00* | (2006.01) |
| *F21Y 115/10* | (2016.01) |
| *B60R 11/00* | (2006.01) |
| *F21V 33/00* | (2006.01) |

(52) U.S. Cl.
CPC ..... *B60R 2011/0026* (2013.01); *F21S 10/023* (2013.01); *F21V 33/0056* (2013.01); *F21W 2121/00* (2013.01); *F21Y 2113/13* (2016.08); *F21Y 2115/10* (2016.08); *H04R 2201/025* (2013.01); *H04R 2201/028* (2013.01); *H04R 2201/403* (2013.01); *H04R 2499/13* (2013.01)

(58) Field of Classification Search
CPC ........ H04R 2201/021; H04R 2201/025; H04R 2201/028; H04R 2201/403; H03R 3/00; B60R 11/0217; B60R 2011/0026; F21S 10/023; F21W 2121/00; F21Y 2113/13; F21Y 2115/10; F21V 33/0056
See application file for complete search history.

(56) References Cited

U.S. PATENT DOCUMENTS

| | | | |
|---|---|---|---|
| 4,103,983 A | 8/1978 | Morrison et al. | |
| 4,212,445 A | 7/1980 | Hagen | |
| 4,289,290 A | 9/1981 | Miller | |
| 4,334,211 A | 6/1982 | McConnell et al. | |
| 4,362,907 A | 12/1982 | Polacsek | |
| 4,471,415 A | 9/1984 | Larson et al. | |
| 4,580,653 A | 4/1986 | Owens | |
| 4,620,268 A | 10/1986 | Ferenc | |
| 4,673,056 A | 6/1987 | Koppelomaki | |
| 5,094,316 A | 3/1992 | Rosen | |
| 5,286,928 A | 2/1994 | Borland | |
| 5,646,381 A | 7/1997 | Boyte, Jr. | |
| 5,946,401 A | 8/1999 | Ferren | |
| 5,979,590 A | 11/1999 | Telmos | |
| 6,497,586 B1 | 12/2002 | Wilson | |
| D468,727 S | 1/2003 | Manneschi | |
| 6,522,755 B1 | 2/2003 | Warnaka et al. | |
| D476,644 S | 7/2003 | Manneschi | |
| D480,069 S | 9/2003 | Carbone et al. | |
| 6,722,776 B1 | 4/2004 | Lyons et al. | |
| D494,565 S | 8/2004 | Yao | |
| D496,923 S | 10/2004 | Allen | |
| 6,845,840 B2 | 1/2005 | Cowan et al. | |
| D501,841 S | 2/2005 | Hsu | |
| 6,966,682 B2 | 11/2005 | Frank et al. | |
| 7,387,414 B2 | 6/2008 | Helms et al. | |
| D629,139 S | 12/2010 | Cai et al. | |
| D638,823 S | 5/2011 | Schindler | |
| 7,970,149 B2 | 6/2011 | Reardon et al. | |
| D641,340 S | 7/2011 | Huh | |
| 8,073,156 B2 | 12/2011 | Hutt et al. | |
| D654,907 S | 2/2012 | McManigal | |
| D655,274 S | 3/2012 | McManigal | |
| D656,258 S | 3/2012 | Georgitsis et al. | |
| D658,159 S | 4/2012 | Janky et al. | |
| D658,160 S | 4/2012 | Janky et al. | |
| D659,677 S | 5/2012 | Kim et al. | |
| D669,883 S | 10/2012 | Cheng | |
| D676,990 S | 2/2013 | Adams | |
| 8,439,522 B2 | 5/2013 | Kim | |
| D685,349 S | 7/2013 | Ohno et al. | |
| D689,234 S | 9/2013 | Zhang et al. | |
| D697,247 S * | 1/2014 | Mollaghaffari | D26/76 |
| D699,389 S | 2/2014 | Guzzini | |
| D706,748 S | 6/2014 | Hara | |
| D711,026 S | 8/2014 | Haumann | |
| 8,796,930 B2 * | 8/2014 | Adams | B60Q 1/26 315/80 |
| D714,763 S | 10/2014 | Woo et al. | |
| D717,477 S | 11/2014 | Nakamura et al. | |
| 8,879,758 B2 | 11/2014 | Yamauchi et al. | |
| D719,284 S | 12/2014 | Mizushiro et al. | |
| D720,723 S | 1/2015 | Cho | |
| D721,059 S | 1/2015 | Lehnert | |
| 9,326,061 B2 | 4/2016 | Kim et al. | |
| 9,469,254 B1 | 10/2016 | White et al. | |
| 10,486,613 B2 * | 11/2019 | White | H04R 1/026 |
| 2002/0153195 A1 | 10/2002 | Messner | |
| 2003/0076964 A1 | 4/2003 | Stickles et al. | |
| 2005/0045777 A1* | 3/2005 | Lee | H04R 1/025 248/121 |
| 2007/0075202 A1 | 4/2007 | Gordon | |
| 2009/0304194 A1* | 12/2009 | Eggleston | H04R 29/001 381/59 |
| 2010/0158299 A1 | 6/2010 | Liu | |
| 2010/0220877 A1 | 9/2010 | Ishibashi et al. | |
| 2012/0308065 A1 | 12/2012 | Padalino et al. | |
| 2013/0301861 A1* | 11/2013 | Ho | H04R 1/023 381/332 |
| 2013/0329413 A1* | 12/2013 | Cotta, Sr. | B60Q 1/0483 362/220 |
| 2014/0348352 A1 | 11/2014 | Hattori et al. | |
| 2015/0189439 A1* | 7/2015 | Starobin | H04R 3/12 381/303 |
| 2016/0007115 A1 | 1/2016 | Kouthoofd et al. | |

OTHER PUBLICATIONS

US Patent Office, Office Action dated Oct. 2, 2015 for U.S. Appl. No. 14/180,879, 6 pages.
US Patent Office, Office Action dated Jan. 12, 2016 for U.S. Appl. No. 14/180,879, 11 pages.
US Patent Office, Notice of Allowance dated Aug. 15, 2016 for U.S. Appl. No. 14/180,879, 5 pages.
US Patent Office, Office Action for U.S. Appl. No. 15/283,762 dated Jul. 24, 2017, 10 pages.
US Patent Office, Office Action for U.S. Appl. No. 15/283,762 dated May 9, 2018, 11 pages.
superbrightleds.com, 54W Heavy Duty Off Road LED Light Bar, dated Feb. 12, 2013, 2 pages.
www.4wheelparts.com, Off Road and HID Light Kits dated Oct. 21, 2011, 2 pages.
Mansour, The 4-Wheeler's Holiday Gift Guide dated Feb. 1, 2012, 22 pages.
www.northridge4x4.com, Northridge 4x4 Jeep Parts: Lighting & Electrical, Off Road Lights dated Nov. 19, 2011, 2 pages.
Images Taken from YouTube Video Entitled "Marine Audio Custom Boat Stereo System—Concord, CA" dated Jun. 28, 2012, 1 page.
Logitech, X-540 Speaker System Manual dated Oct. 16, 2007, 14 pages.

(56) References Cited

OTHER PUBLICATIONS

Samsung, Crystal Surround Air Track User Manual dated Dec. 14, 2012, 23 pages.
US Patent Office, Office Action for U.S. Appl. No. 15/283,762 dated Aug. 1, 2017, 12 pages.
US Patent Office, Office Action for U.S. Appl. No. 15/283,762 dated May 9, 2018, 13 pages.
US Patent Office, Office Action for U.S. Appl. No. 15/283,724 dated Dec. 20, 2018, 12 pages.
US Patent Office, Notice of Allowance for U.S. Appl. No. 15/283,762 dated Jul. 29, 2019, 13 pages.
US Patent Office, Notice of Abandonment for U.S. Appl. No. 15/283,762 dated Nov. 26, 2018, 2 pages.

* cited by examiner

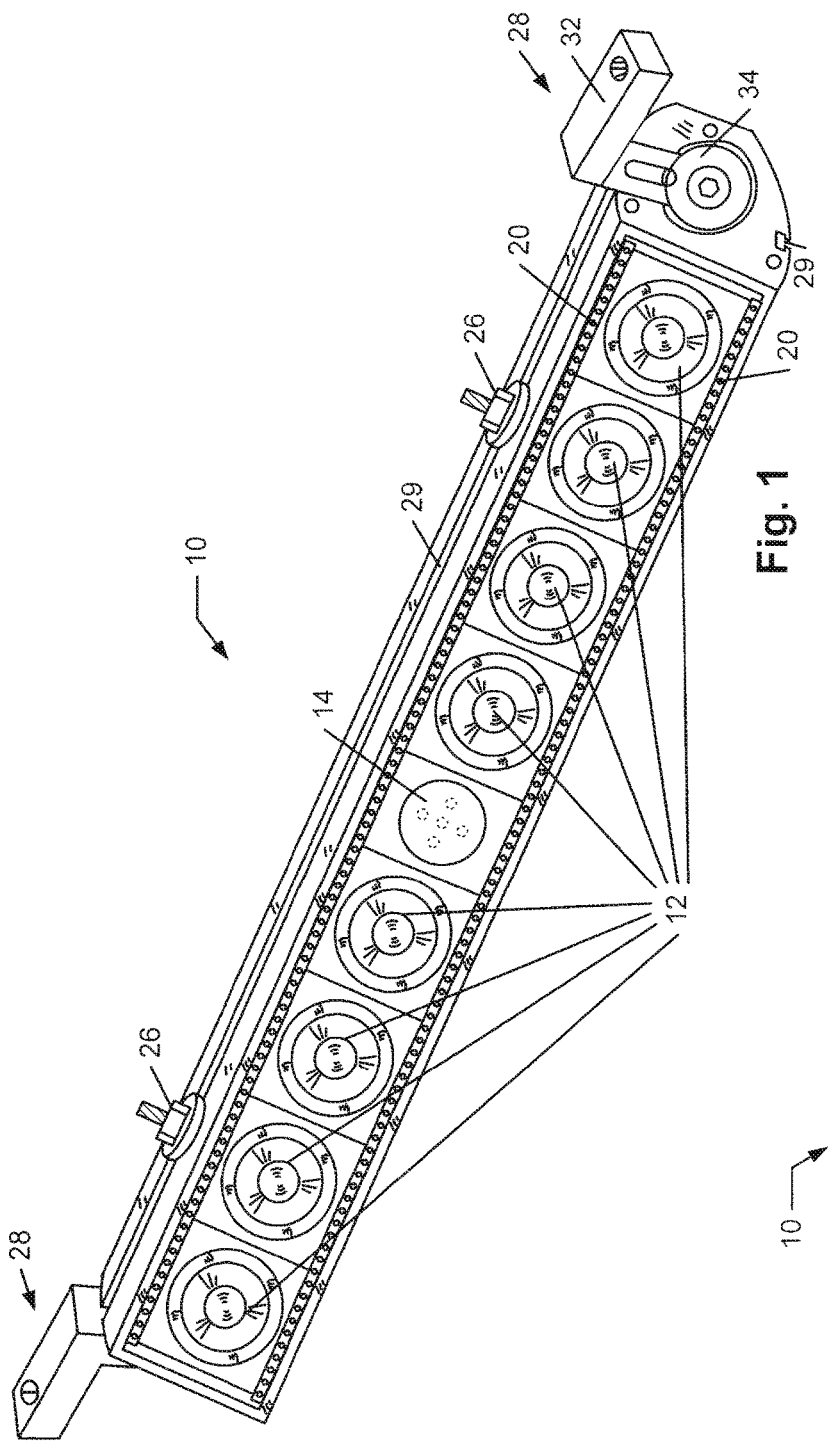
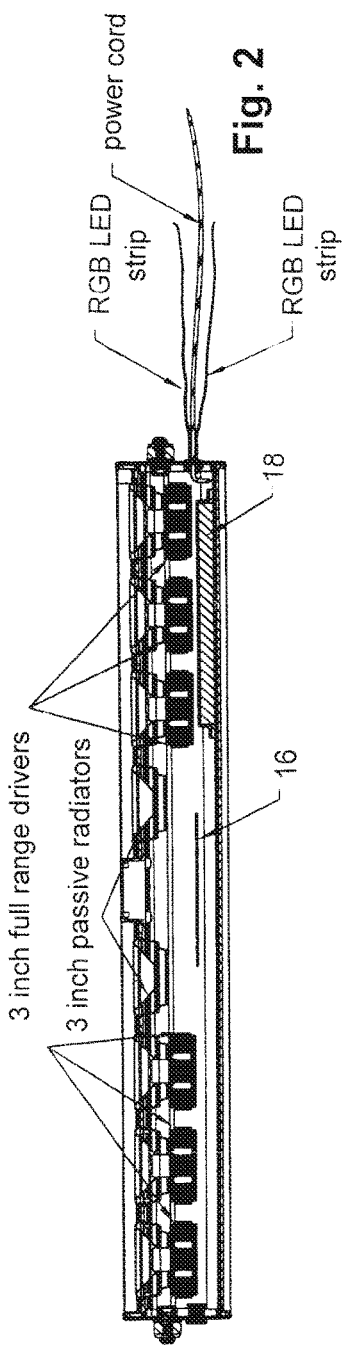

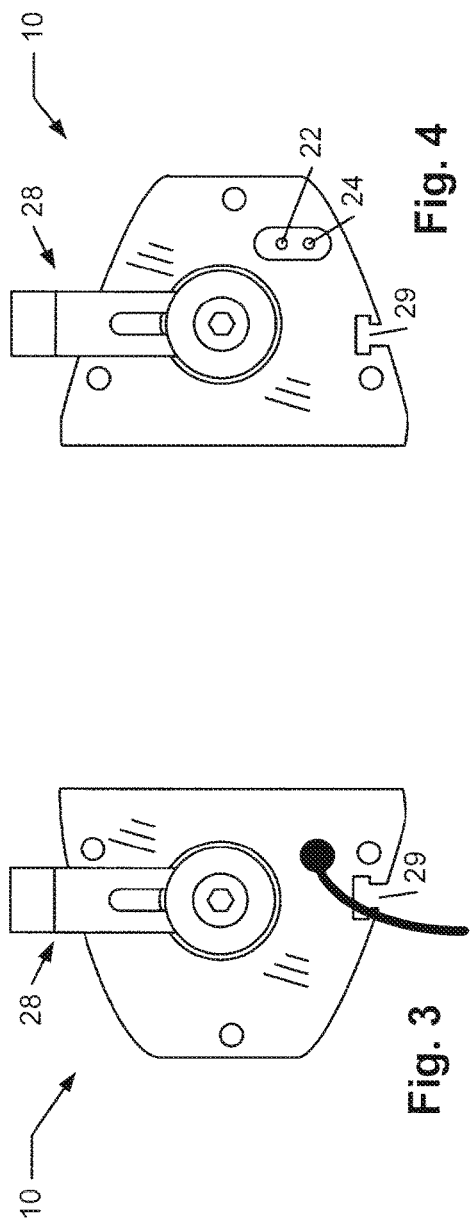
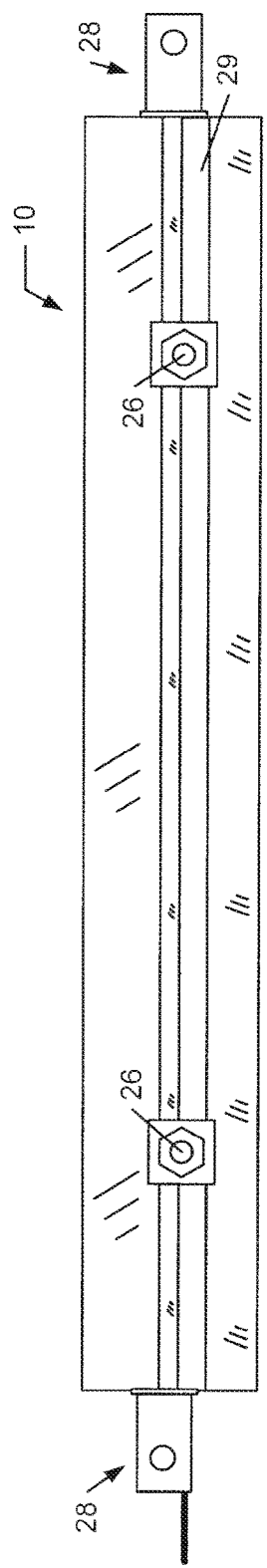
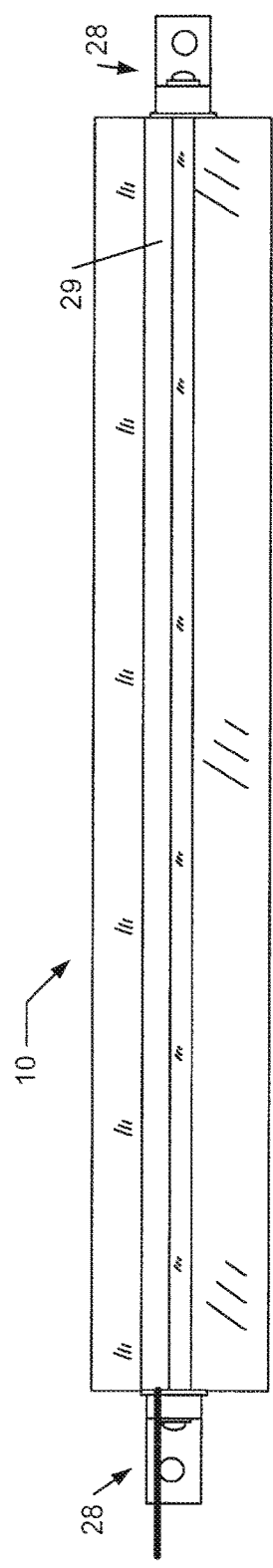

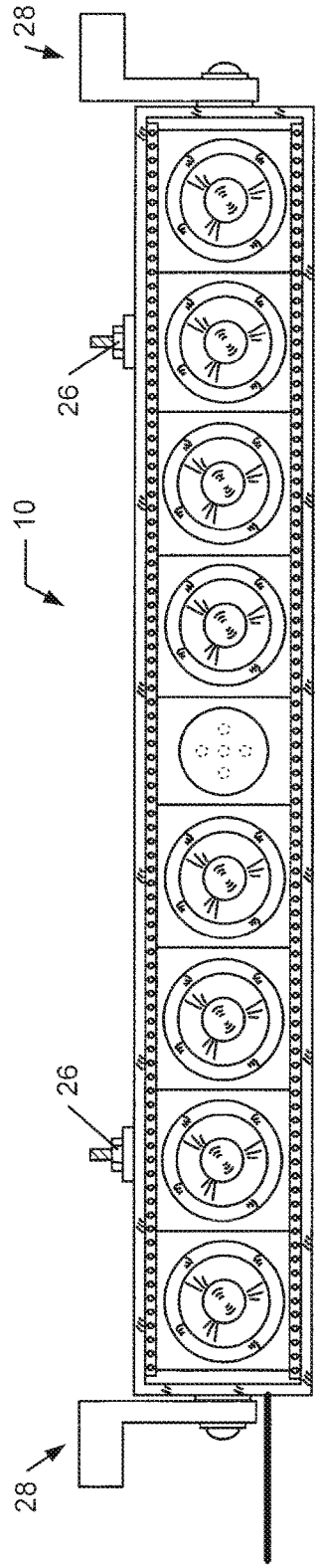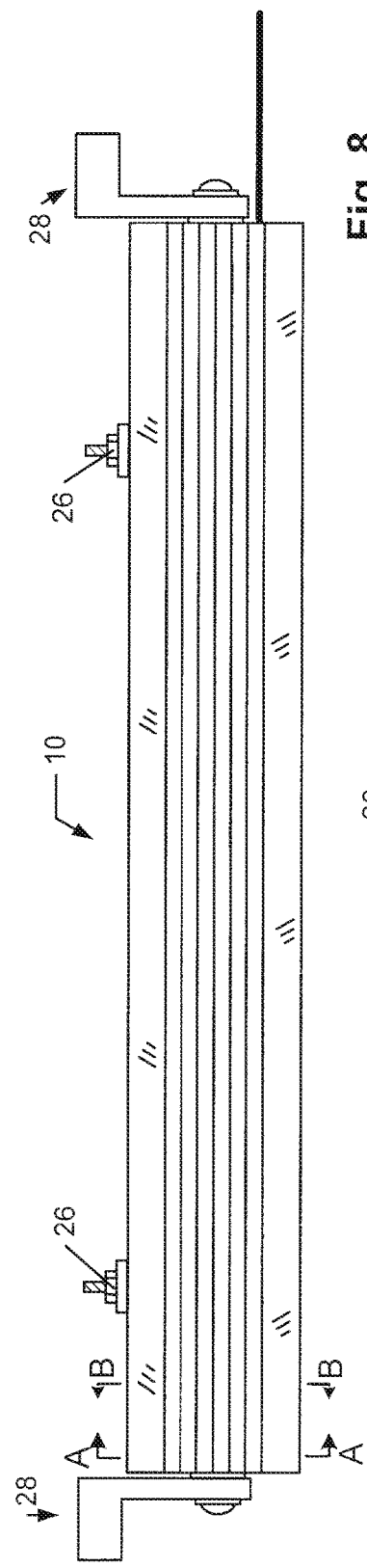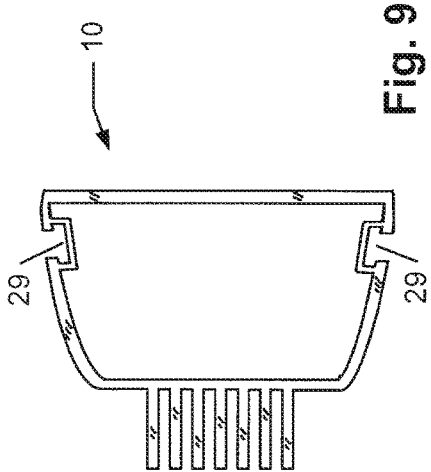

SPEAKER SYSTEMS FOR OFF-ROAD VEHICLES, ATVS, UTVS, WATERCRAFT, AND MOTORCYCLES

PRIORITY CLAIM

This application is a continuation of U.S. patent application Ser. No. 15/283,724, filed on Oct. 3, 2016, which is a continuation of U.S. patent application Ser. No. 14/180,879, now U.S. Pat. No. 9,469,254 filed on Feb. 14, 2014, which claims priority to U.S. Provisional Application No. 61/764,637 filed Feb. 14, 2013. In addition, this application is a continuation-in-part of U.S. Design application Nos. 29/445,639, now Pat. No. D756,961; 29/445,651, now Pat. No. D757,686; 29/445,652, now Pat. No. D756,963; 29/445,656, now Pat. No. D756,964; 29/445,659, now Pat. No. D757,687; 29/445,640, now Pat. No. D756,962 filed Feb. 14, 2013.

BACKGROUND OF THE INVENTION

1. Field of the Invention

This invention generally relates to speaker systems and more specifically to speaker systems for off-road vehicles, ATVs, UTVs, watercraft and motorcycles.

2. Description of the Related Art

The following descriptions and examples are not admitted to be prior art by virtue of their inclusion within this section.

Auxiliary sound systems made for all terrain vehicles (ATV), utility terrain vehicles (UTV), watercraft, and motorcycles generally offer limited acoustical enhancements, place strain on electrical systems of the vehicles, and lack mounting versatility. In particular, all products on the market are plastic molds made to house a car stereo radio and/or car or marine 6.5 inch speakers. As an alternative to housing a car stereo radio, some use the stereo of the vehicle in which they are installed for an audio signal source. In general, stereos in ATVs, UTVs, watercraft and motorcycles offer relatively little power and, thus, the acoustical enhancement of speaker systems utilizing such stereos are limited. To get more sound output, some auxiliary speaker systems include an amplifier. The inclusion of an amplifier, however, will often cause a lot of strain on the electrical systems of ATVs and UTVs, as well as some watercraft and motorcycles, due to their small charging systems. The strain on the electrical systems can in turn cause problems to the performance of the vehicles. Furthermore, most conventional add-on speaker systems for ATVs and UTVs are quite large, bulky, and unattractive. Some require the removal of and/or an addition of an entire roof, making them difficult and costly to install. Moreover, most conventional add-on speaker systems are vehicle specific and, thus, are not versatile to different makes and models of vehicles or even to different types of vehicles. Lastly, many conventional add-on speaker systems have the speakers firing directly down on your head, so the perception of sound quality is very poor.

Accordingly, it would be desirable to develop new speaker sound systems for ATVs, UTVs, watercraft and/or motorcycles. It would be beneficial for such systems to be all-in-one integrated systems, which are compact and suitable for mounting into a variety of vehicles and furthermore, which have a higher perception of sound quality relative to conventional systems.

SUMMARY OF THE INVENTION

Speaker systems are provided, particularly for but not limited to use in off-road vehicles, ATVs, UTVs, watercraft and motorcycles. The follow description of various embodiments of speaker systems and vehicles is not to be construed in any way as limiting the subject matter of the appended claims.

Embodiments of a speaker system include a linear array of speakers and a housing encasing a backside of the linear array of speakers. The speaker system further includes a pipe-mounting clamp coupled to the housing for mounting the speaker system to a surface.

Embodiments of another speaker system include a linear array of speakers, a housing encasing a backside of the linear array of speakers, mounting brackets arranged along opposing lateral sides of the housing for mounting the speaker system to a surface, and a power cord extending from one of the opposing lateral sides of the housing.

BRIEF DESCRIPTION OF THE DRAWINGS

For a more complete understanding of the present invention, and the advantages thereof, reference is now made to the following descriptions taken in conjunction with the accompanying drawings, in which:

FIG. 1 is a front perspective view of an exemplary audio sound bar;

FIG. 2 is a bottom view of the audio sound bar depicted in FIG. 1 without its backside casing;

FIGS. 3 and 4 are, respectively, left-side and right-side views of the audio sound bar depicted in FIG. 1;

FIGS. 5 and 6 are, respectively, top and bottom views of the audio sound bar depicted in FIG. 1;

FIGS. 7 and 8 are, respectively, front and rear views of the audio sound bar depicted in FIG. 1; and FIG. 9 is a cross-sectional view thereof taken between axes AA and BB of the audio sound bar depicted in FIG. 8.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

The disclosure herein relates to speaker systems particularly for but not limited to vehicular applications in which passengers are not or not able to be fully enclosed within the confines of the vehicle, such as some off-road vehicles (such as but not limited to ATVs, dirt bikes, dune buggies, sandrails, some rock crawlers), UTVs, watercraft and motorcycles. In particular, vehicles that do not enable passengers to be fully enclosed within their confines are vehicles void of windows, doors, roofs and/or windshields. Additional speakers are often desirable within such vehicles (i.e., relative to vehicles in which passengers are able to be fully enclosed) to overcome ambient noise and/or to enhance the enjoyment of using the vehicle, particularly since many of such vehicles are used for recreation. In some embodiments, the speaker systems described herein may be configured as add-on or after market systems in that they are installed in a vehicle after manufacture of the vehicle. In other words, the speaker systems may be retrofitted into a vehicle. Alternatively, the speaker systems described herein may be installed in a vehicle while the vehicle is being manufactured. In any case, it is noted that the term speaker system may be interchangeably used herein with the term audio system.

As used herein, an all-terrain vehicle (ATV) refers to a vehicle having three, four or six low-pressure tires, a seat that is straddled by the operator, and handlebars for steering control. ATVs generally do not have overhead occupant protective structures or overhead windshield frames. An ATV is commonly known as a three-wheeler, four-wheeler, quad or quad bike. Dirt bikes are motorized two wheeled vehicles which include a seat that is straddled by the operator and handlebars for steering control. Dirt bikes are a subset of motorcycles which are specifically designed for off-road use and, thus, are not generally classified as street legal. Dune buggies, sandrails and rock crawlers generally have four or more tires and differ from ATVs by having windshield frames, roll over bars and/or roofs as well as non-straddle seating and steering wheels instead of handle bars. Dune buggies, sandrails and rock crawlers also differ from ATVs by having a generally wider and/or longer tire base. A utility terrain vehicle (UTV) refers to a vehicle with four or more non-highway tires, a steering wheel, non-straddle seating, and an overhead occupant protective structure. UTVs differ from dune buggies, sandrails and rock crawlers by having a generally narrower and/or shorter tire base. UTVs are commonly known as side-by-side vehicles and recreational off-highway vehicles. As used herein, watercraft refers to any vessel configured for water transport and/or activity, such as but not limited to boats and personal watercraft. A motorcycle refers to a vehicle having two in-line tires, a seat that is straddled by the operator, and handlebars for steering control. Motorcycles and some watercraft do not have overhead occupant protective structures or overhead windshield frames.

In some embodiments, the speaker systems disclosed herein may be all-in-one audio systems in that they include one or more speakers, their own audio signal source and optionally at least one amplifier. Due to such a compilation of components, the audio systems need not be connected to an independent audio signal to function and, thus, when installed in vehicles, the systems may be operationally independent from the stereo of the vehicles. Furthermore, the audio systems may have minimal wiring, particularly only a single jacket wire with power and ground and, if applicable, LED lighting wires. In yet other embodiments, the speaker systems described herein may be void of their own audio signal source and/or an amplifier. In such cases, a speaker system may be coupled to a stereo system of a vehicle when installed therein or alternatively to another device within the vehicle that has its own audio signal source. In any case, the speaker systems described herein may, in some embodiments, include additional components, such as but not limited to a Bluetooth source unit, a light source (e.g., light emitting diodes), auxiliary input ports (e.g., for an MP3 player), and auxiliary output ports (e.g., to go to an external amplifier for a subwoofer or additional speakers). In some cases, the auxiliary input and output ports may be used to connect multiple audio systems together.

In some cases, the speakers systems described herein may include a battery or a battery pack. In general, ATVs, UTVs, as well as some off-road vehicles and watercraft have very small batteries and many times these vehicles are used to listen to the stereo with the vehicle off. Having a battery or a battery pack in the audio systems described herein allows a user to use the audio system independent of a main battery of a vehicle, preventing the deterioration thereof. The audio systems described herein may be coupled to a main battery of a vehicle such that a battery or battery pack incorporated therein is charged by the main battery when the vehicle is running, but then supplies primary power to the audio system when the vehicle is not running. So, an audio system need not be removed from a vehicle to charge it. An example of a suitable battery pack is a lithium ion battery pack, but other types of batteries may be used.

An additional feature of the speaker systems described herein is that they may have mounting mechanisms and, in some embodiments, mounting mechanisms specifically for suspending the speaker system. The mounting mechanisms may include but are not limited to nuts and bolts for attaching to flat surfaces, pipe mounts (such as for mounting to roll bars or frames), and sliding tracks. Other mounting mechanisms known in the art may be used. In some cases, an audio system may include a plurality of different mounting mechanisms such that it may be mounted different locations of a vehicle and/or in a variety of different types of vehicles. In any case, the mounting mechanisms may sometimes be configured for relatively quick disconnects or release such that the audio system may be easily and quickly detached from a given location/vehicle. Examples of mounting mechanisms which are configured for relatively quick disconnects or release are those described in reference to FIGS. 1-9, specifically bolt-on application 26, mounting brackets 28 and sliding track mounts 29. Other types of mounting mechanisms which offer relatively quick disconnects or release may be considered for the speaker systems described herein. Given such detachability and that the audio systems may in some embodiments include a battery or battery pack and their own audio signal source as noted above, the audio systems described herein may in some cases be portable, allowing a user to take an audio system with them and place it in another location, such as setting it on a table or mounting it to another structure.

In general, the audio systems described herein may be mounted in any location within and/or on a vehicle, (i.e., in front of, beside, or behind its driver seat and/or passenger seats), including but not limited to the dashboard, the roof, the hood, the handle bars, the steering wheel, the floor boards, or the door panels. In some cases, it may be particularly advantageous to have an audio system arranged such that the speakers face the driver seat and/or front passenger seats of the vehicle. In particular, the human auditory system hears sound best from the front and, thus, positioning the speakers of the audio systems described herein toward a driver seat and/or passenger seats of a vehicle may optimize the perception of sound therefrom. A particularly suitable spot for the audio systems described herein in some off-road vehicles, UTVs and some watercraft may be in proximity of or directly attached to an upper bar of a windshield frame, a front roll bar and/or a front edge of a roof. In particular, such vehicles generally have plenty of headroom for protection during rollovers and, thus, have plenty of room for installation of an audio system which may have speakers directed at the driver seat and/or front passenger seats of a vehicle. ATVs, motorcycles and some watercraft (such as personal watercraft) do not generally include windshield frames, roll over bars or roofs and, thus, in such cases, the audio system described herein may be mounted on the handle bars of the vehicle or above/upon a hood of the vehicle. In other embodiments, an audio system may be installed behind, below, above, and/or beside a driver seat and/or a passenger seat of an ATV, motorcycle, or personal watercraft.

An example of an audio system is depicted in FIGS. 1-9. It is noted that the configuration of the audio system illustrated is merely exemplary. Many other configurations may be considered for the audio systems considered herein. For example, although FIGS. 1-9 illustrate an audio system with eight speakers, the audio systems described herein are not so limited. In particular, the audio systems described herein may include any number of speakers, including a single speaker or any plurality of speakers. For example, it may be advantageous to make a shorter or longer array of speakers for an audio system and, thus, an audio system may alternatively include four or ten speakers or any other number of speakers. Furthermore, the audio systems described herein are not restricted to having a linear array of speakers as illustrated for the configuration depicted in FIGS. 1-9. In particular, any arrangement of speakers may be considered for the audio systems described herein. As such, the audio systems described herein are not limited to the depictions in the drawings. Furthermore, it is noted that the drawings are not necessarily drawn to scale in that particular features may be drawn to a larger scale than other features to emphasize their characteristics.

FIGS. 1-9 illustrates audio system 10 having a linear array of eight speakers 12 split on either side of control panel 14. Although not shown, a grid may be arranged over the face of the system, particularly in front of speakers 12 for a cosmetic effect. It is noted that control panel 14 need not be central to the linear array speakers and further may alternatively be disposed on the side, top, bottom or back of the housing encasing the backside of the speakers. As shown in the bottom view of audio system 10 in FIG. 2 (without its back-side casing), six of the eight speakers may be active and the other two speakers may be passive. Other numbers and arrangements of active and passive speakers may be considered or all the speakers may be active. In yet other cases, tweeter speakers may be included in audio system 10 with active and/or passive speakers. In general, any type of speakers and any combination of speaker types may be included in the audio systems described herein. Furthermore, speakers of any size may be considered for the audio systems described herein. In some cases, particularly when the audio system is mounted in proximity to an upper bar of a windshield frame, a front roll bar and/or a front edge of a roof, relatively small speakers may be of interest in order to give enough clearance from individuals sitting in the driver seat and/or front passenger seat of the vehicle. For example, speakers having a width or diameter of approximately 4 inches or less may be advantageous.

As further shown in FIG. 2, audio system 10 may include amplifier 16 for the active speakers. In general, the amplifier is matched to the speakers to provide optimum output and sound quality and, in some embodiments, the amplifier may be a full range class D high efficiency amplifier. In any case, the audio system 10 may include its own audio signal source such that it may be operationally independent from other stereo systems, such as a head unit of a vehicle. In yet other embodiments, audio system 10 may be void of its own audio signal source and/or amplifier.

FIG. 2 further depicts the inclusion of battery 18 and FIG. 1 depicts the inclusion of light emitting diode (LED) lights 20 within audio system 10, either of which may be optional as noted above, depending on the design specifications of the audio system. Furthermore, the number, type and placement of battery 18 and LED lights 20 may vary depending on the design specifications of the system. In some cases, an LED may be placed central to each speaker. The LED lights may include red, green and blue (RGB) LEDs for cool effects and may be turned white for use as a dome light. In some embodiments, other types of light sources may be additionally or alternatively included in the system. As shown in FIG. 4, audio system 10 may include auxiliary input port 22 (e.g., for a consumer to stream audio to the system via an MP3 player) and/or auxiliary output port 24 (e.g., to connect to an external amplifier for a subwoofer or to connect to additional speakers). Although not shown, audio system 10 may include a Bluetooth source unit as noted above. All of such components of audio system 10 may be encased in a housing, which may be of any material and construction suitable to be water-resistant, weather-resistant, UV-resistant and durable to handle the jarring motion off-roading conditions. An example material may be aluminum, but other materials such as plastics, composites or other metals may be considered.

Although the speakers are not restricted to a linear array, such a configuration lends to a long, narrow and compact unit, which may be particularly advantageous for arranging in front of a driver and/or a passenger of a vehicle, such as in proximity of an upper bar of a windshield frame, a front roll bar and/or a front edge of a roof, which as noted above are applicable for UTVs, dune buggies, sandrails and rock crawlers. Alternatively, an audio system with a linear array of speakers may be mounted on the dashboard, on the handle bars or upon a hood of a vehicle. In yet other embodiments, an audio system with a linear array of speakers may be installed behind, below, above, and/or beside a driver seat and/or a passenger seat of a vehicle. As used herein, the phrase linear array of speakers refers to a group of speakers aligned in a single line or row.

As noted above, the audio systems described herein may include one or more types of mounting mechanisms and may particularly include a mounting mechanism which is configured to suspend the audio system. As further noted above, the audio systems described herein may, in some embodiments, include a plurality of different mounting mechanisms such that they may be mounted at different locations of a vehicle and/or in a variety of different types of vehicles. An example of three different types of mounting mechanisms is illustrated in FIGS. 1-9, including bolt-on application 26 on the upper surface of the unit, mounting brackets 28 along the sides of the unit configured for flat surface and/or pipe mounting, and sliding track mounts 29 along the top and bottom of the housing. In some cases, bolt-on applications 26 may be arranged over the sliding track mount that is arranged along the top surface of the housing as shown in FIGS. 1 and 5. It is noted that in such embodiments bolt-on applications 26 may be removable, particularly in situations when the sliding track mount on the top surface of the housing is to be used to secure the speaker system to a structure. In other cases, bolt-on applications 26 may be arranged over other portions of the top surface of the housing (i.e., not over the sliding track mount comprising the upper surface of the housing). In any case, it is noted that sliding track mounts 29 may include any configuration known in the art for sliding track mounts and, thus, they are not limited to the cross-sectional design, width, or depth depicted in FIGS. 1, 3, 4, and 9. Furthermore, sliding track mounts 29 may extend between lateral ends of the housing of audio system 10 as shown in FIGS. 1-9, but they are not necessarily so limited. In particular, it is contemplated that one or both of sliding track mounts 29 may extend less than the full length of the housing. Furthermore, audio system 10 may include more than one sliding track along the upper and/or lower surfaces of the housing.

The configuration of mounting brackets 28 to be for flat surface mounting is that the upper surfaces of mounting brackets 28 shown in FIGS. 1, 3, 4, 7 and 8 are substantially flat. In particular, the substantially flat upper surfaces of mounting brackets 28 shown in FIGS. 1, 3, 4, 7 and 8 may be abutted and secured to substantially flat surfaces of structures via a nut and bolt or a screw through the hole shown in L-shaped portions 32 of mounting brackets 28. The configuration of mounting brackets 28 to be for flat surface mounting and pipe mounting may be provided via an addendum part to the brackets shown in FIGS. 1-9. In particular, mounting brackets 28 may include an addendum part with a substantially flat surface to detachably mate with the substantially flat upper surface of L-shaped portions 32 shown in FIGS. 1, 3, 4, 7 and 8. In addition, the opposing surface of the addendum part may be concave for mating with a pipe. The addendum part may be removably secured to L-shaped portion 32 by any means known in the art for securing two parts together, such as but not limited to nuts and bolts, screws, sliding tracks, magnets, etc. In yet other cases, L-shaped portions 32 may be configured for pipe mounting. In particular, the upper surface of L-shaped portions 32 shown in FIGS. 1, 3, 4, 7 and 8 may alternatively be concave. In such embodiments, mounting brackets 28 may be configured solely for pipe mounting. In other such cases, however, mounting brackets 28 may include an addendum part configured for coupling with the upper surface of the concave L-shaped portions and further have a substantially flat opposing surface for mounting to a substantially flat surface of a structure.

In any case, mounting brackets 28 may be adjustable such that the speakers of the unit may be directed toward the driver seat and/or front passenger seat of a vehicle. In particular, L-shaped portions 32 of mounting brackets 28 may swivel about circular portions 34 which are attached to the sides of the housing encasing the backside of speakers 12. In this manner, when L-shaped portions 32 are secured to a structure, linear array of speakers 12 and all of the components encased in its backside housing may be moved in a rotary manner, particularly to change the angle at which the linear array of speakers is directed. It is noted that L-shaped portions 32 may swivel 360 degrees about circular portions 34 and, thus, in some cases, mounting brackets 28 may be adjusted to attach audio system 10 to an underlying structure or a sideways structure. In particular, mounting brackets 28 may be adjusted to move L-shaped portions 32 approximately 180 degrees from the positions depicted in FIGS. 1-9 such that the parts of L-shaped portions 32 jutting out from the side of the housing are in proximity to the lower surface of the housing. In fact, mounting brackets 28 may be adjusted to move L-shaped portions 32 any number of degrees from the positions depicted in FIGS. 1-9 such that L-shaped portions 32 may be secured to a structure, whether it is overhead, sideways or under linear array of speakers 12. In any case, circular portions 34 may be secured to the sides of the housing via a nut and bolt or screw, which may be further tightened to secure L-shaped portions 32 in a particularly position.

It is noted that audio system 10 is not restricted to the combination of mounting mechanisms depicted in FIGS. 1-9. In particular, audio system 10 may alternatively be void of one or two of bolt-on application 26, mounting brackets 28, and sliding track mounts 29 or may be void of all three mounting mechanisms. Moreover, audio system 10 may include other mounting mechanisms in addition to or alternative to bolt-on application 26, mounting brackets 28, and sliding track mounts 29. In yet other embodiments, audio system 10 may be void of any mounting mechanisms.

It will be appreciated to those skilled in the art having the benefit of this disclosure that this invention is believed to provide speaker systems, particularly for but not limited to use in off-road vehicles, ATVs, UTVs, watercraft and motorcycles. Further modifications and alternative embodiments of various aspects of the invention will be apparent to those skilled in the art in view of this description. For example, although the aforementioned figures and accompanying text describe an example of a speaker system with a linear array of speakers, the speaker systems described herein are not so limited. In particular, any number and arrangement of speakers may be considered for the speaker systems described herein. Accordingly, this description is to be construed as illustrative only and is for the purpose of teaching those skilled in the art the general manner of carrying out the invention. It is to be understood that the forms of the systems shown and described herein are to be taken as the presently preferred embodiments. Elements and materials may be substituted for those illustrated and described herein, parts and processes may be reversed, and certain features of the systems may be utilized independently, all as would be apparent to one skilled in the art after having the benefit of this disclosure. Changes may be made in the elements described herein without departing from the spirit and scope of the invention as described in the following claims.

What is claimed:

1. A speaker system, comprising:
   a first linear array of speakers arranged side by side;
   a second linear array of speakers arranged side by side;
   a housing encasing backsides of the first and second linear arrays of speakers, wherein the first and second linear arrays of speakers are respectively arranged on opposing sides of a midline of the housing and such that front sides of each of the speakers in the first and second linear arrays of speakers are collectively aligned in an Euclidean plane;
   a pipe-mounting clamp coupled to the housing for mounting the speaker system to a surface; and
   light emitting diodes arranged along a side of the speaker system comprising the front sides of the speakers, wherein the light emitting diodes comprise a strip of light emitting diodes aligned with an upper edge of the housing.

2. The speaker system of claim 1, further comprising a control panel having a user interface facing in a same direction as the front sides of the speakers.

3. The speaker system of claim 1, wherein the pipe-mounting clamp is one of two pipe-mounting clamps that are coupled to opposing lateral sides of the housing.

4. The speaker system of claim 3, further comprising a power cord extending from one of the opposing lateral sides of the housing.

5. The speaker system of claim 1, wherein each of the speakers comprises a diameter of approximately 4 inches or less.

6. A speaker system, comprising:
   a linear array of speakers;
   a housing encasing a backside of the linear array of speakers;
   mounting brackets arranged along opposing lateral sides of the housing for mounting the speaker system to a surface, wherein the mounting brackets are rotationally adjustable relative to the housing by at least 180 degrees; and a power cord extending from one of the opposing lateral sides of the housing, wherein the power cord is coupled to the housing such that a casing of the power cord external to the housing is in contact with an external surface of the speaker system that is parallel with the opposing lateral side of the housing from which power cord extends.

7. The speaker system of claim 6, wherein the mounting brackets are pipe-mounting clamps.

8. The speaker system of claim 6, further comprising a control panel arranged along a side of the speaker system comprising a front side of the linear array of speakers.

9. The speaker system of claim 6, wherein each of the speakers comprises a diameter of approximately 4 inches or less.

10. The speaker system of claim 6, further comprising light emitting diodes arranged along a side of the speaker system comprising a front side of the linear array of speakers.

11. The speaker system of claim 10, wherein the power cord comprises wires to power the light emitting diodes.

12. The speaker system of claim 11, wherein the light emitting diodes comprise one or more packages of RGB (red, green, and blue) light emitting diodes.

13. The speaker system of claim 1, wherein the light emitting diodes comprise one or more packages of RGB (red, green, and blue) light emitting diodes.

14. A speaker system, comprising:
a linear array of speakers;
a housing encasing a backside of the linear array of speakers;
mounting brackets arranged along opposing lateral sides of the housing for mounting the speaker system to a surface, wherein the mounting brackets are rotationally adjustable relative to the housing by at least 180 degrees; and
a power cord extending from one of the opposing lateral sides of the housing, wherein a casing of the power cord comprising an exterior surface of the speaker system extends from a coupling point of the power cord with the opposing lateral side of the housing in a direction that is aligned with a length of the housing.

15. The speaker system of claim 14, wherein the mounting brackets are pipe-mounting clamps.

16. The speaker system of claim 14, further comprising light emitting diodes arranged along a side of the speaker system comprising a front side of the linear array of speakers.

17. The speaker system of claim 16, wherein the light emitting diodes comprise one or more packages of RGB (red, green, and blue) light emitting diodes.

18. The speaker system of claim 1, wherein the light emitting diodes further comprise light emitting diodes arranged central to one of the linear array of speakers.

* * * * *